United States Patent
Casanova et al.

(10) Patent No.: US 10,630,033 B2
(45) Date of Patent: Apr. 21, 2020

(54) SURGE PROTECTED LUMINAIRE

(71) Applicant: SIGNIFY HOLDING B.V., Eindhoven (NL)

(72) Inventors: Maurice Lucien Eugene Casanova, Maastricht (NL); Flavien Berthier, Eindhoven (NL)

(73) Assignee: SIGNIFY HOLDING B.V., High Tech Campus ( * ) Notice: Subject to any disclaimer, the term of this patent is extended or adjusted under 35 U.S.C. 154(b) by 396 days.

(21) Appl. No.: 15/608,662

(22) Filed: May 30, 2017

(65) Prior Publication Data

US 2017/0352994 A1  Dec. 7, 2017

(30) Foreign Application Priority Data

Jun. 3, 2016 (EP) ................................. 16290101
Aug. 26, 2016 (EP) ................................. 16185822

(51) Int. Cl.

| | |
|---|---|
| *H01R 24/48* | (2011.01) |
| *F21V 23/00* | (2015.01) |
| *F21V 23/06* | (2006.01) |
| *F21V 25/04* | (2006.01) |
| *F21V 25/10* | (2006.01) |
| *H01R 13/646* | (2011.01) |

(Continued)

(52) U.S. Cl.
CPC ........... *H01R 24/48* (2013.01); *F21V 23/002* (2013.01); *F21V 23/06* (2013.01); *F21V 25/04* (2013.01); *F21V 25/10* (2013.01); *H01R 13/646* (2013.01); *H01R 13/648* (2013.01); *H02H 9/04* (2013.01)

(58) Field of Classification Search
CPC ........ H01R 24/48; F21V 23/002; F21V 23/06
See application file for complete search history.

(56) References Cited

U.S. PATENT DOCUMENTS 6,467,414 B1 * 10/2002 Fisher .................... F42B 3/121
  102/202.3
7,161,785 B2 * 1/2007 Chawgo .................... H01T 4/06
  361/119

(Continued)

FOREIGN PATENT DOCUMENTS

| DE | 202005019739 U1 * | 3/2006 | ........... H05B 41/282 |
|---|---|---|---|
| DE | 202005019739 U1 | 3/2006 | |

(Continued)

*Primary Examiner* — Scott Bauer
(74) *Attorney, Agent, or Firm* — Daniel J. Piotrowski

(57) ABSTRACT

A luminaire (10) is disclosed with built-in surge protection. The luminaire comprises an electrically conductive structure including a carrier (11) carrying at least one active circuit component (15, 16) and a shielding element (13) at least partially covering the carrier inside a housing, a set of active conductors (17, 19) connected to the active circuit component for connecting the active circuit component to a mains supply including a neutral (N) and live (L) terminal, wherein one of said terminals is further connected to the shielding element by a connection (19') bypassing the at least one active circuit. The housing comprises a cover (21) over the electrically conductive structure, wherein the shielding element defines a clearance (25) between the electrically conductive structure and the cover, said clearance comprising a pinch point (27) between the shielding element and the cover.

15 Claims, 6 Drawing Sheets

(51) Int. Cl.
*H01R 13/648* (2006.01)
*H02H 9/04* (2006.01)

(56) References Cited

U.S. PATENT DOCUMENTS

| | | | | |
|---|---|---|---|---|
| 7,433,167 | B2 * | 10/2008 | Schediwy | G06F 3/03547 |
| | | | | 361/112 |
| 8,786,996 | B1 * | 7/2014 | Shapson | H02H 9/06 |
| | | | | 361/119 |
| 2004/0042218 | A1 * | 3/2004 | Wang | F21V 15/01 |
| | | | | 362/368 |
| 2007/0040246 | A1 * | 2/2007 | Chen | G06F 3/03547 |
| | | | | 257/666 |
| 2010/0085725 | A1 * | 4/2010 | Chuang | H05K 9/0067 |
| | | | | 361/816 |
| 2014/0111894 | A1 | 4/2014 | Schug | |
| 2014/0268763 | A1 | 9/2014 | Duckworth | |
| 2016/0204600 | A1 * | 7/2016 | Muehlschlegel | H01H 83/10 |
| | | | | 315/125 |

FOREIGN PATENT DOCUMENTS

| | | | |
|---|---|---|---|
| JP | 2011171320 | A | 9/2011 |
| KR | 20120092843 | A | 8/2012 |
| WO | 2014029772 | A1 | 2/2014 |
| WO | 2015149210 | A1 | 10/2015 |

* cited by examiner

SURGE PROTECTED LUMINAIRE

FIELD OF THE INVENTION

The present invention relates to a luminaire, in particular an outdoor luminaire, comprising an electrically conductive structure including a carrier carrying at least one active circuit inside a housing and a set of active conductors connected to the active circuit component for connecting the active circuit component to a mains supply including a neutral and live terminal.

BACKGROUND OF THE INVENTION

The design of luminaires such as outdoor luminaires, e.g. street lighting, traffic lights, and so on, is typically mandated by standards to ensure that such luminaires comply with the applicable health and safety regulations. Such luminaires may be subdivided into the following classes.

Class I luminaires, which are electrically insulated and provided with a connection to earth in order to protect exposed metal parts that become live, e.g. in case of electrical insulation failure.

Class II luminaires, which are designed such that protection against electric shock does not rely on basic electrical insulation only.

Class III luminaires, for which protection against electric shock relies on the so-called supply at Safety Extra-Low Voltage (SELV) in which voltages above SELV (max. 50V AC RMS) are not generated.

Where luminaires are mounted on electrically insulating structures, e.g. wooden poles, insulating mounting wires or the like, connection to ground may not be feasible, such that Class II luminaires often are used in such circumstances, e.g. when replacing a traditional luminaire with a solid state lighting, e.g. LED-based, luminaire, for example to reduce maintenance needs for the luminaire owing to the excellent lifetime characteristics of solid state lighting-based luminaires as well as to reduce energy costs owing to the excellent energy consumption characteristics of such luminaires. Unfortunately, many luminaires (and in particular Class II luminaires) are particularly vulnerable to common mode surges, e.g. caused by an unforeseen electrical discharge such as a lightning strike, as such surges can negatively impact the lifetime of the active circuit components, e.g. one or more driver circuits and/or one or more light engines, of the luminaire. Such common mode surges for example may occur due to the presence of parasitic capacitances in the luminaire. For example, a parasitic capacitance may exist between copper tracks and the aluminium substrate of a metal core printed circuit board (MCPCB), which can provide an undesired electrical path in case of a surge event.

Therefore, there exists a need for some form of surge protection in such luminaires. However, the widely applicable luminaire standard IEC 60598-1 prevents the use of overvoltage protection devices inside a luminaire to ensure common mode protection. KR 2012/0092843 A discloses a substrate for an LED lighting device having an electromagnetic shielding function to prevent the damage of an inner lead of LEDs by discharging and bypassing electromagnetic energy through a ground pattern. This however cannot be used in Class II luminaires due to the absent ground connection in such luminaires.

SUMMARY OF THE INVENTION

The present invention seeks to provide a luminaire, in particular a Class II luminaire, having a design that exhibits improved robustness against common mode surges.

According to an aspect, there is provided a luminaire comprising an electrically conductive structure including a carrier carrying at least one active circuit component and a shielding element at least partially covering the carrier inside a housing, a set of active conductors connected to the active circuit component for connecting the active circuit component to a mains supply including a neutral and live terminal, wherein one of said active conductors is further connected to the shielding element by a connection bypassing the at least one active circuit; and the housing comprising a cover over the electrically conductive structure, wherein the shielding element defines a clearance between the electrically conductive structure and the cover, said clearance comprising a pinch point between the shielding element and the cover.

The inclusion of such a shielding element having a clearance including a pinch point with the cover provides a discharge path between the shielding element and the cover via the pinch point, such that common mode surges may travel between the cover and one of the mains terminals via the connection bypassing the at least one active circuit component, thereby protecting the at least one active circuit component from such common mode surges without the need for surge protection circuits in the luminaire, such that the luminaire may comply with standards such as luminaire standard IEC 60598-1.

Preferably, the shielding element is connected to the active conductor for connecting the active circuit component to the neutral terminal such that the power surges may be dissipated via the neutral terminal.

The shielding element or the cover may comprise a bulge defining the pinch point. Alternatively, both the cover and the shielding element may comprise such a bulge, which respective bulges cooperate to form the pinch point. Such bulges may have any suitable shape, e.g. a rounded shape, a pointed shape, and so on.

For the sake of manufacturing simplicity, the shielding element may form part of the carrier. In an embodiment, the carrier comprises a metal substrate acting as the shielding element. For example, the carrier may be a metal core printed circuit board.

The pinch point may define a further clearance of at least 1.6 mm between the shielding element and the cover, and preferably may define a further clearance of at least 3 mm between the shielding element and the cover. At a clearance of at least 1.6 mm, the overall clearance between the electrically conductive structure and the cover ensures that the luminaire is compliant with the luminaire standard IEC 60598-1 when operating at a RMS voltage not exceeding 150V whereas at a clearance of at least 3 mm, the overall clearance between the electrically conductive structure and the cover ensures that the luminaire is compliant with the luminaire standard IEC 60598-1 when operating at a RMS voltage not exceeding 250V.

The at least one active circuit component may comprise a light engine and a driver circuit for the light engine. Preferably, the light engine comprises at least one solid state lighting element in order to provide a luminaire having excellent lifetime characteristics and energy efficiency compared to traditional luminaires, e.g. based on incandescent or fluorescent lighting.

In order to protect a person servicing the luminaire from electric shock, at least part of the electrically conductive structure preferably carries an electrically insulating protection. Alternatively, the luminaire may further comprise a breaker circuit arranged to disrupt a power supply to the electrically conductive structure upon removal of the cover from the housing.

In at least some embodiments, the luminaire is a Class II luminaire.

The luminaire may be an outdoor luminaire such as a street lamp or a traffic light.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
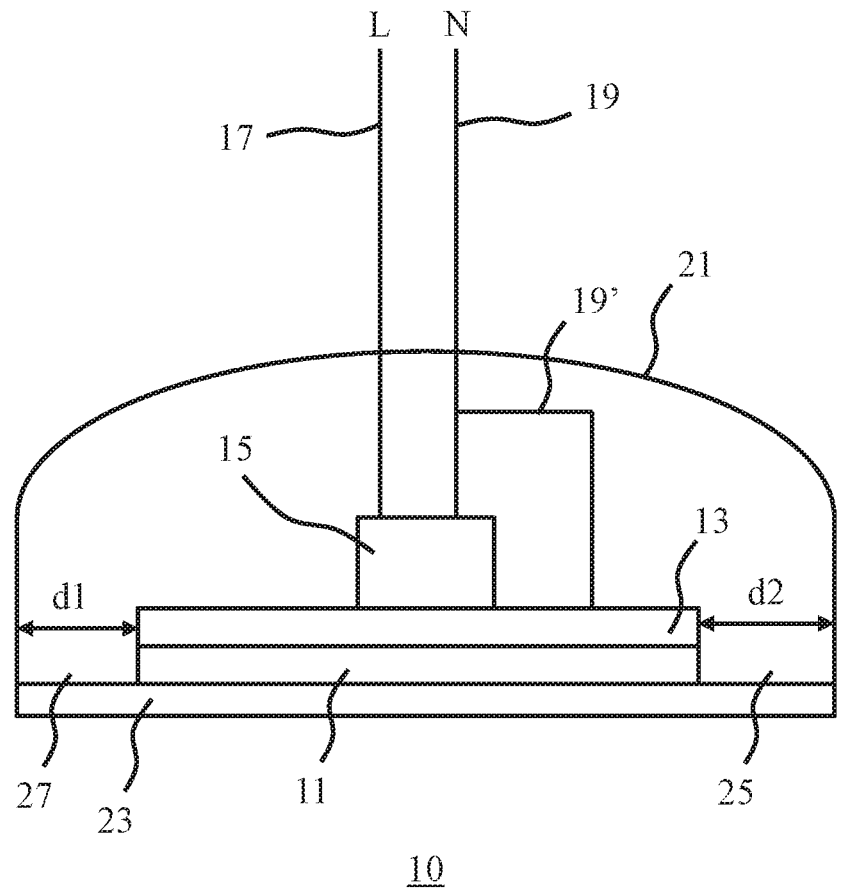
FIG. 1 schematically depicts a cross-section of a luminaire according to an embodiment.

It should be understood that the Figures are merely schematic and are not drawn to scale. It should also be understood that the same reference numerals are used throughout the Figures to indicate the same or similar parts.

FIG. 1 schematically depicts a luminaire 10 according to an example embodiment. The luminaire 10 comprises a carrier 11 carrying at least one active circuit component 15, such as one or more light engines, e.g. a light engine comprising at least one solid state lighting element such as a LED, and at least one driver circuit for controlling the light engine(s). The carrier 11 in some embodiments may comprise a printed circuit board (PCB) such as a metal core PCB (MCPCB). The luminaire 10 further comprises a first active conductor or terminal 17 for connecting the at least one active circuit component 15 to the live terminal L of a mains power supply and a second active conductor or terminal 19 for connecting the at least one active circuit component 15 to the neutral terminal N of a mains power supply. The first terminal or active conductor 17 and the second terminal or active conductor 19 for example may form part of the carrier 11 and may take any suitable shape, e.g. pins, sockets, clips, solder pads, conductive tracks and so on. In the context of the present application, an active conductor is an intended conductive path, e.g. a conductive path to supply an active circuit component 15 with power.

The carrier 11 carrying at least one active circuit component 15 may be referred to as an electrically conductive structure within the housing of the luminaire 10, which housing comprises a cover 21 at least partially enveloping the electrically conductive structure. The cover 21 may be made of an electrically conductive material, e.g. a metal or metal alloy, an electrically insulating material, e.g. glass or plastic or a combination thereof, and may be translucent or transparent such that light generated within the housing, e.g. by the light engine(s), can pass the cover 21. The cover 21 may be diffusive and/or may comprise one or more optical elements, e.g. lenses, collimators or the like, in order to shape the luminous output produced by the light engine(s) within the housing of the luminaire 10. In an embodiment, the cover 21 may be secured against a body 23, e.g. an electrically insulating body 23, that further supports the carrier 11. The cover 21 may be secured against the body 23 in any suitable manner, e.g. using fasteners such as screws, clips, or the like. The cover 21 may be partially attached to the body 23, e.g. by a hinge mechanism allowing the cover to swivel or swing open for access to the internals of the luminaire 10. A watertight seal (not shown) such as a rubber seal may be present between the cover 21 and the body 23 to prevent water ingress into the luminaire 10, which is particularly desirable in case of the luminaire 10 being intended for outdoor use.

The luminaire 10 further comprises a shielding element 13, which typically is made of an electrically conductive material, e.g. a metal, metal alloy, a conductive coating or the like, and which is arranged to shield the at least one active circuit component 15 from being exposed to a common mode surge phenomenon such as a lightning strike hitting the luminaire 10. The shielding element 13 may be arranged on the carrier 11, e.g. as a layer substantially or entirely covering a major surface of the carrier 11 such that the shielding element 13 delimits a clearance 25 between the electrically conductive structure and the cover 21. This clearance typically is dimensioned (i.e. has a width d2) compliant with the applicable luminaire standards, such as for example the luminaire standard IEC 60598-1. The shielding element 13 may be located in any suitable location, such as between the carrier 11 and the at least one active circuit component 15 or between the carrier 11 and the body 23. In some embodiments, the shielding element 13 may form an integral part of the carrier 11.

The clearance 25 further comprises a localized narrowing or pinch point 27 having a width d1 between the shielding element 13 and the cover 21, which width d1 is smaller than the overall width d2 of the clearance 25 but is still compliant with the applicable luminaire standards. In other words, the clearance 25 may have a localized portion having minimum width (pinch point) 27 that matches the minimum clearance requirements as defined within the applicable luminaire standard, with the remainder of the clearance 25 having a larger width d2 that exceeds the minimum clearance requirements as defined within the applicable luminaire standard. For example, the pinch point 27 may define a clearance of at least 1.6 mm between the shielding element 13 and the cover 21 in order to make the luminaire 10 compliant with the luminaire standard IEC 60598-1 for RMS mains voltages up to 150V, or the pinch point 27 may define a clearance of at least 3 mm between the shielding element 13 and the cover 21 in order to make the luminaire 10 compliant with the luminaire standard IEC 60598-1 for RMS mains voltages up to 250V. It should be understood that other clearance dimensions for the pinch point 27 may be applied without departing from the teachings of the present invention. In particular, the pinch point 27 may have any dimension that corresponds to a minimum clearance dimension as mandated by a relevant luminaire standard.

The pinch point 27 creates an arc discharge path between the shielding element 13 and the cover 21 such that upon the cover 21 (or the shielding element 13) being subjected to a sudden electrical surge, e.g. due to a nearby lighting strike or the like, the associated electrical charge is transferred from the cover 21 to the shielding element 13 (or vice versa) across the pinch point 27. In this manner, the shielding element 13 including the pinch point 27 acts as a lightning rod for collecting the electrical charge from the cover 21.

The shielding element 13 is further connected to one of the terminals or active conductors 17, 19 through an electrically conductive connection 19' that bypasses the at least one active circuit component 15. Preferably, the shielding element 13 is connected to the second terminal or active conductor 19 in this manner, such that the shielding element 13 is connected to the neutral terminal N of the mains supply when the luminaire 10 is connected to mains. During an electrical surge event, the bypass connection 19' ensures that the electrical charge collected by the shielding element 13 substantially bypasses the at least one active circuit component 15, thereby protecting the at least one active circuit component 15 from breakdown or damage. In other words, the shielding element 13 provides equipotential bonding between the cover 21 and the mains supply, thus shielding the at least one active circuit component 15 from surge events. Although this principle may be applied to any type of luminaire 10 comprising one or more active circuit components, this principle is particularly advantageous in luminaires 10 comprising one or more solid state lighting elements, e.g. LEDs, as their light engines, as such light engines are particularly vulnerable to exposure to the short high-energy impulses associated with surge phenomena.

Figure 2:
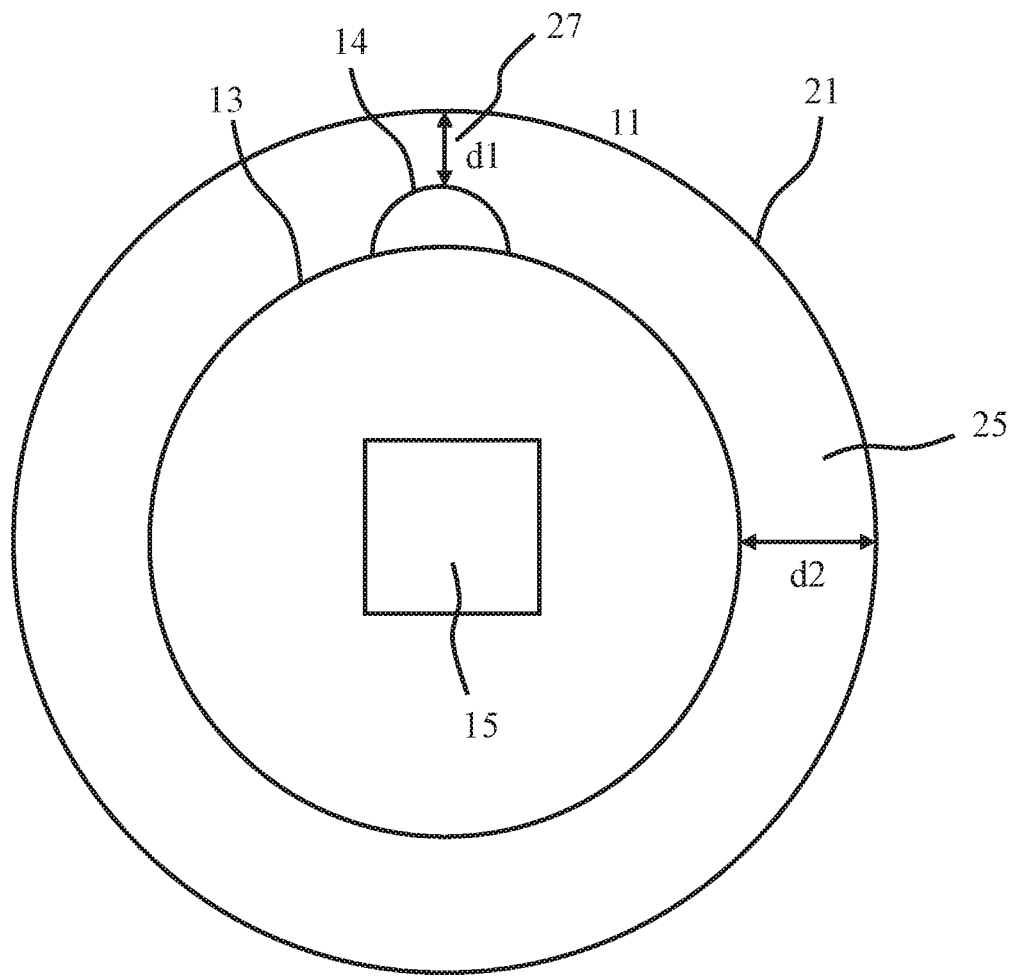
FIG. 2 schematically depicts a top view of a luminaire according to an embodiment.
Figure 3:
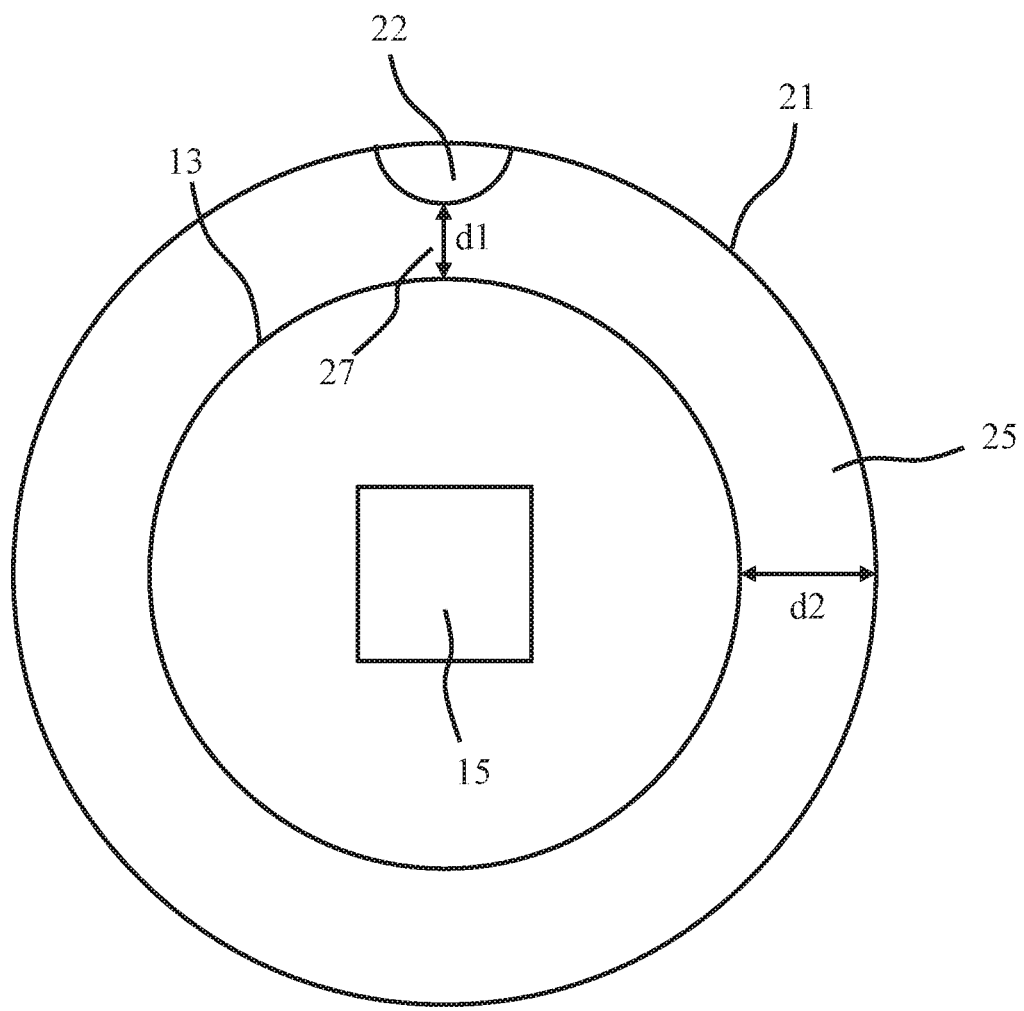
FIG. 3 schematically depicts a top view of a luminaire according to an alternative embodiment.
Figure 4:
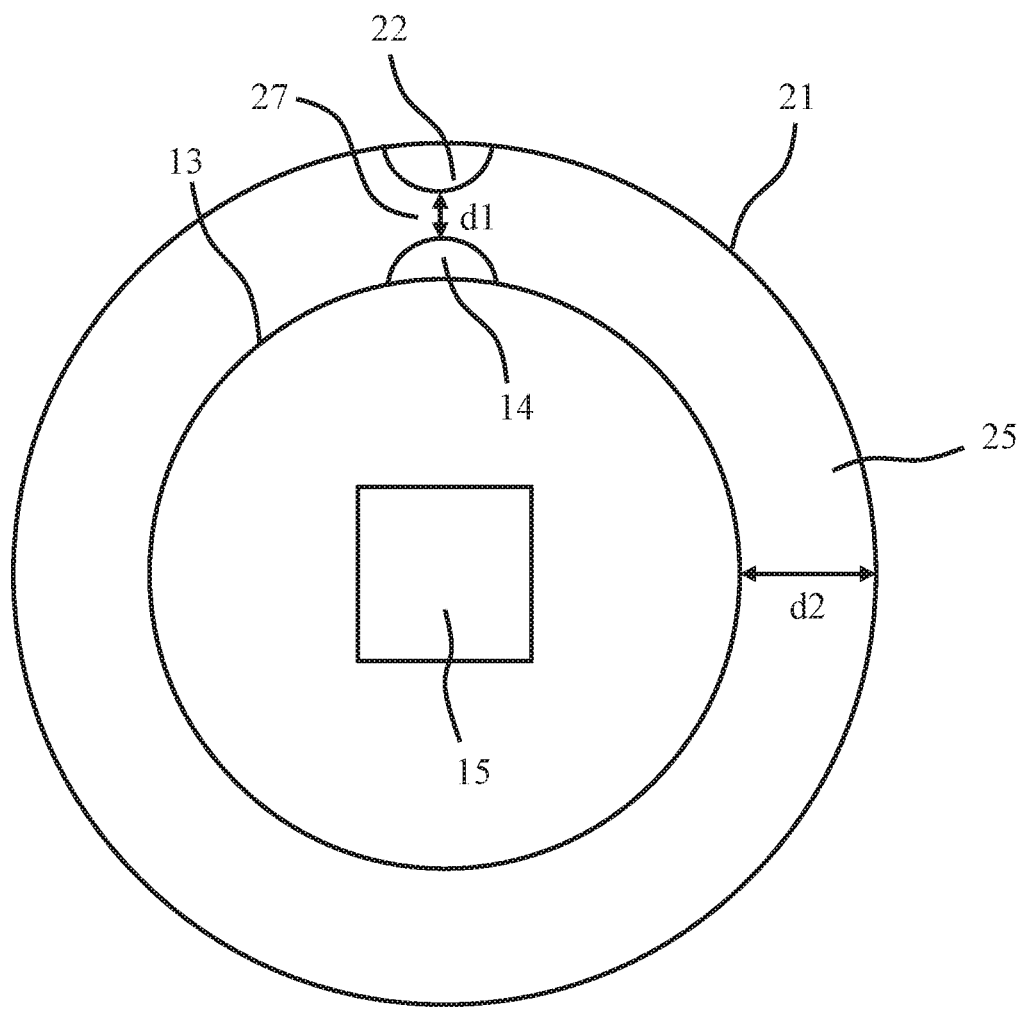
FIG. 4 schematically depicts a top view of a luminaire according to a further alternative embodiment.

As schematically depicted in FIG. 2, the shielding element 13 may comprise a bulge or protrusion 14 facing the cover 21 to create the pinch point 27 in the clearance 25. Alternatively, as schematically depicted in FIG. 3, the cover 21 may comprise a bulge or protrusion 22 facing the shielding element 13 to create the pinch point 27 in the clearance 25. In yet another embodiment schematically depicted in FIG. 4, the shielding element 13 comprises a bulge or protrusion 14 and the cover 21 comprises a bulge or protrusion 22, which respective bulges or protrusions 14, 22 cooperate to define the pinch point 27. It should be understood that the bulges or protrusions 14, 22 shown in FIG. 2-4 have rounded shapes by way of non-limiting example only. Such bulges or protrusions 14, 22 may have any suitable shape, e.g. a pointed shape, in order to create a pinch point 27 having the desired discharge characteristics.

In an embodiment, the luminaire 10 may be a luminaire for outdoor use, e.g. a street lamp or a traffic light. Other types of outdoor luminaires to which the teachings of the present invention may be applied will be immediately apparent to the skilled person. The luminaire 10 in some embodiments may be a Class II luminaire as such a luminaire particularly benefits from application of embodiments of the present invention due to the absence of a connection to ground or earth in such luminaires.

Figure 5:
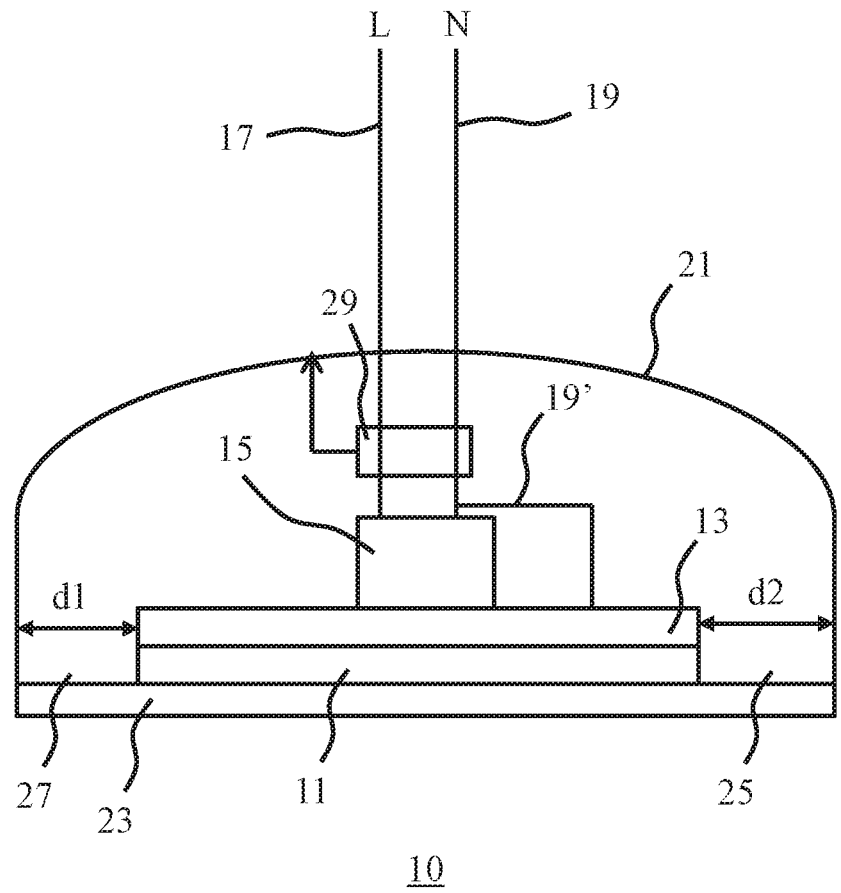
FIG. 5 schematically depicts a cross-section of a luminaire according to another embodiment.

The luminaire 10 may further comprise additional safety features, for example to protect a person accessing the internals of the luminaire 10 from electric shock. For example, as schematically depicted in FIG. 5, the luminaire 10 may comprise a breaker switch 29 that disrupts the power supply to the luminaire 10 upon removal of the cover 21 from the body 23. Such a breaker switch 29 may be implemented in any suitable manner, for example as a pressure switch in between the cover 21 and the body 23 that enables power to be supplied to the luminaire 10 upon the cover 21 pressing on this switch and disrupts the power supply to the luminaire 10 in the absence of such pressure. Alternatively or additionally, an internally isolated cover (not shown) may also be included to provide the internals of the luminaire 10 with basic electrical insulation.

Figure 6:
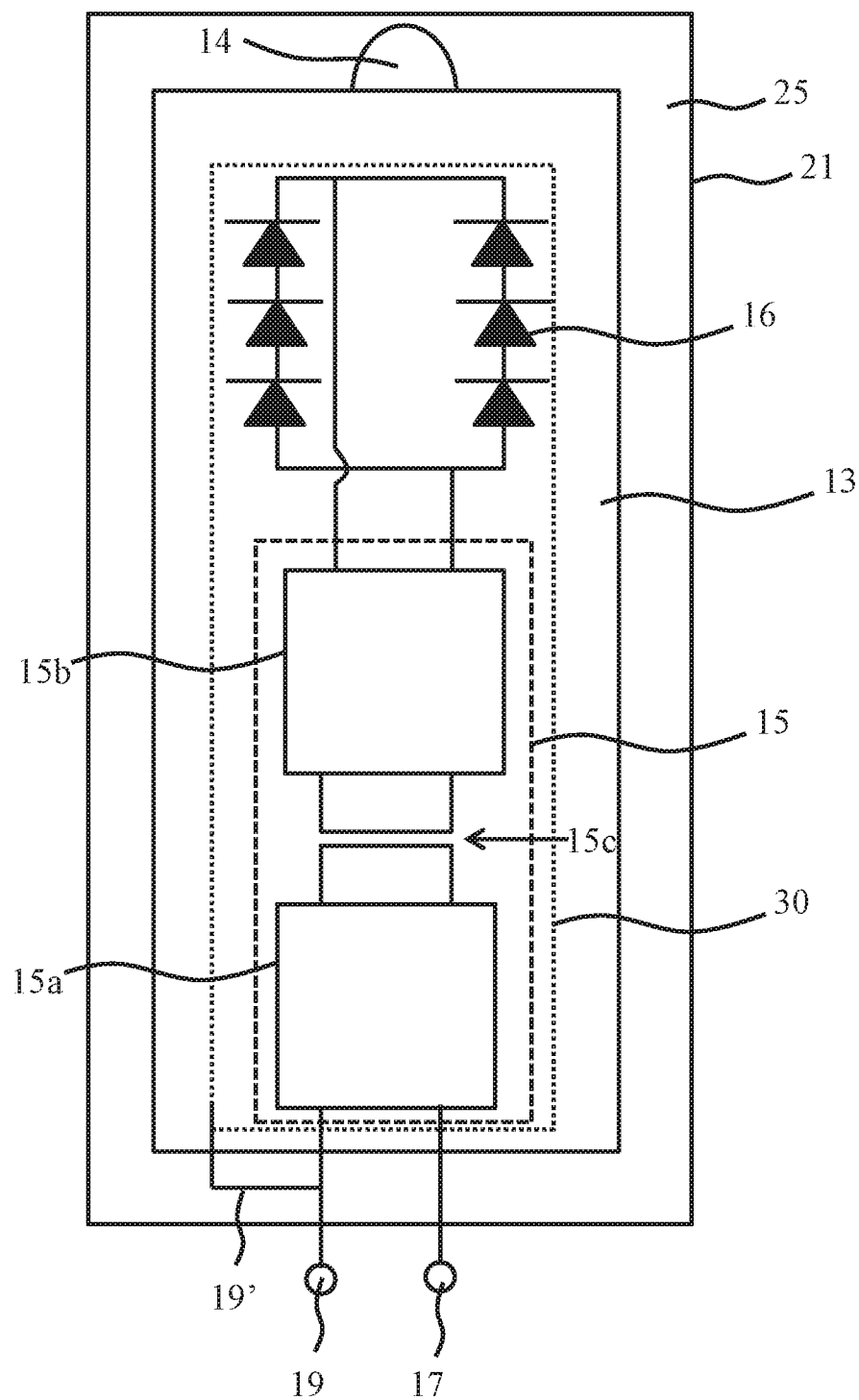
FIG. 6 schematically depicts an aspect of a luminaire according to an embodiment in more detail.

FIG. 6 schematically depicts an aspect of an example embodiment of the luminaire 10 in which the at least one active circuit component 15 comprises a driver circuit coupled to a light engine 16. The driver circuit 15 may comprise an input stage 15a and an output stage 15b, which optionally may comprise an isolation 15c between the input stage 15a and an output stage 15b, e.g. such as in the family of Xitanium™ isolated LV drivers marketed by the Philips Lighting Corporation. An electrical insulation 30 may be provided around the driver circuit 15 and optionally around the light engine 16 to protect a person touching the driver circuit 15 (or the light engine 16) from electric shock. In case of an electrical insulation 30 around the light engine 16, it will be understood that such electrical insulation should be at least partially transparent if it covers the light exit surface of the light engine 16. As previously explained, the light engine 16 preferably comprises one or more solid state lighting elements such as LEDs. The electrical insulation 30 provide the luminaire 10 with additional protection in addition to the surge protection provided by the clearance 25 including the pinch point 27 between shielding element 13 and the cover 21 (not shown in FIG. 6). It is noted for the avoidance of doubt that the respective active circuit components 15 may have separate electrical insulation 30, e.g. an electrical insulation layer covering such an active circuit component. Any suitable electrically insulating material may be used for such an electrical insulation layer, e.g. an electrically insulating plastic material, ceramic material, or the like.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A luminaire comprising:
an electrically conductive structure including a carrier carrying at least one active circuit component and a shielding element at least partially covering the carrier inside a housing;
a set of active conductors connected to the active circuit component for connecting the active circuit component to a mains supply including a neutral (N) and live (L) terminal, wherein one of said active conductors is further connected to the shielding element by a connection bypassing the at least one active circuit; and
the housing comprising a cover over the electrically conductive structure, wherein the shielding element defines a clearance between the electrically conductive structure and the cover, said clearance comprising a pinch point between the shielding element and the cover; whereby the pinch point creates an arc discharge path between the shielding element and the cover such that upon the occurrence of a surge event, the shielding element provides equipotential bonding between the cover and the mains supply, thus shielding the at least one active circuit component from the surge event.

2. The luminaire of claim 1, wherein the shielding element is connected to the active conductor for connecting the at least one active circuit component to the neutral (N) terminal.

3. The luminaire of claim 1, wherein the shielding element or the cover comprises a bulge defining the pinch point.

4. The luminaire of claim 1, wherein both the cover and the shielding element comprises a respective bulge, said respective bulges cooperating to define the pinch point.

5. The luminaire of claim 1, wherein the shielding element forms part of the carrier.

6. The luminaire of claim 5, wherein the carrier comprises a metal substrate acting as the shielding element.

7. The luminaire of claim 1, wherein the pinch point defines a further clearance of at least 1.6 mm between the shielding element and the cover.

8. The luminaire of claim 1, wherein the at least one active circuit component comprises a light engine and a driver circuit for the light engine.

9. The luminaire of claim 8, wherein the light engine comprises at least one solid state lighting element.

10. The luminaire of claim 1, wherein at least part of the electrically conductive structure carries an electrically insulating protection.

11. The luminaire of claim 1, further comprising a breaker circuit arranged to disrupt a power supply to the electrically conductive structure upon removal of the cover from the housing.

12. The luminaire of claim 1, wherein the luminaire is a Class II luminaire.

13. The luminaire of claim 1, wherein the luminaire is an outdoor luminaire such as a street lamp or a traffic light.

14. The luminaire of claim 1, wherein the pinch point defines a further clearance of at least 3 mm between the shielding element and the cover.

15. A luminaire comprising:

an electrically conductive structure including a carrier carrying at least one active circuit component and a shielding element at least partially covering the carrier inside a housing;

a set of active conductors connected to the active circuit component for connecting the active circuit component to a mains supply including a neutral (N) and live (L) terminal, wherein one of said active conductors is further connected to the shielding element by a connection bypassing the at least one active circuit; and the housing comprising a housing cover, said housing cover at least partially covering the electrically conductive structure, wherein the shielding element defines a clearance between the electrically conductive structure and the housing cover, said clearance comprising a pinch point between the shielding element and the housing cover.

* * * * *